United States Patent [19]

Agness et al.

[11] 3,851,451

[45] Dec. 3, 1974

[54] AUTOMATIC HEIGHT CONTROL SYSTEM FOR A CROP HARVESTER

[75] Inventors: Jay Byron Agness, East Moline; Duane Herbert Ziegler, Moline; Garn Farley Penfold, East Moline, all of Ill.

[73] Assignee: Deere & Company, Moline, Ill.

[22] Filed: Aug. 31, 1973

[21] Appl. No.: 393,304

Related U.S. Application Data

[63] Continuation-in-part of Ser. No. 237,334, March 23, 1972, abandoned.

[52] U.S. Cl................ 56/10.2, 56/DIG. 15, 56/208
[51] Int. Cl............................................. A01d 75/18
[58] Field of Search............ 56/10.2, 10.4, DIG. 15, 56/208

[56] References Cited
UNITED STATES PATENTS

| | | | |
|---|---|---|---|
| 2,750,727 | 6/1956 | Wright............................ | 56/DIG. 15 |
| 2,972,847 | 2/1961 | Matthews....................... | 56/DIG. 15 |
| 3,286,448 | 11/1966 | Moore............................ | 56/DIG. 15 |
| 3,643,407 | 2/1972 | Hubbard et al................. | 56/10.2 |
| 3,698,164 | 10/1972 | Boone et al..................... | 56/DIG. 15 |

*Primary Examiner*—Antonio F. Guida

[57] ABSTRACT

An automatic height control system for the crop-gathering unit of a combine includes a plurality of individually movable ground followers or height sensors, each of which carries a magnetic actuation member movable past a series of reed switches which are connected to a logic circuit through a multiple contact height selector switch. The selector switch provides selection of any pair of adjacent reed switches associated with each of the ground followers to provide raise and hold signals to the logic circuit. The logic circuit is connected to a pair of solenoids controlling a valve for the raise and lower cylinders for the crop-gathering unit. The logic circuit normally activates the lower solenoid, but is responsive to the closing of any one of the hold reed switches to deactivate the lower solenoid and is responsive to closing of any one of the raise reed switches to activate the raise solenoid and deactivate the lower solenoid. In a second embodiment of the invention, the selector switch has been omitted and each individually movable ground follower has associated therewith a single reed switch to provide a raise signal and a single reed switch to provide a hold signal, with the reed switches being connected directly to the logic circuit. In the second embodiment, the reed switches and magnets which close the reed switches are in fixed position with respect to each other and the ground follower moves a slide between the switches and their magnets to selectively block the magnetic field from the reed switches.

13 Claims, 11 Drawing Figures

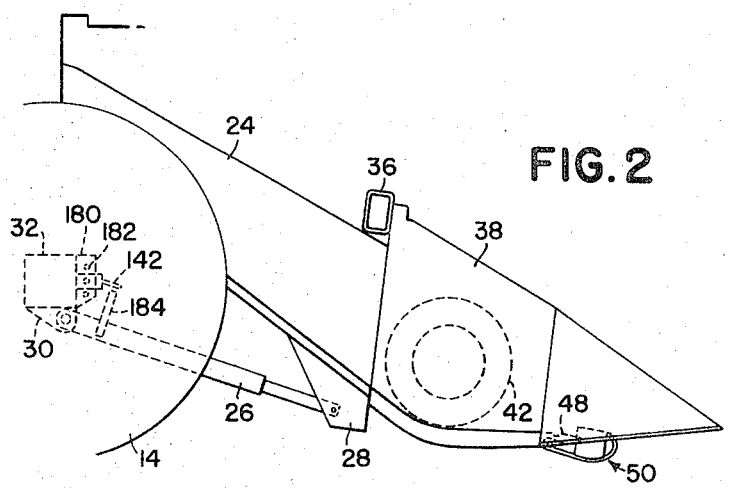
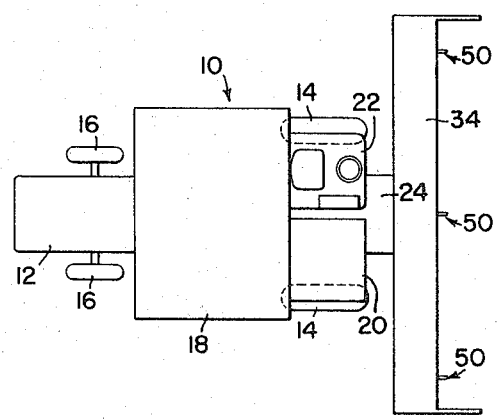
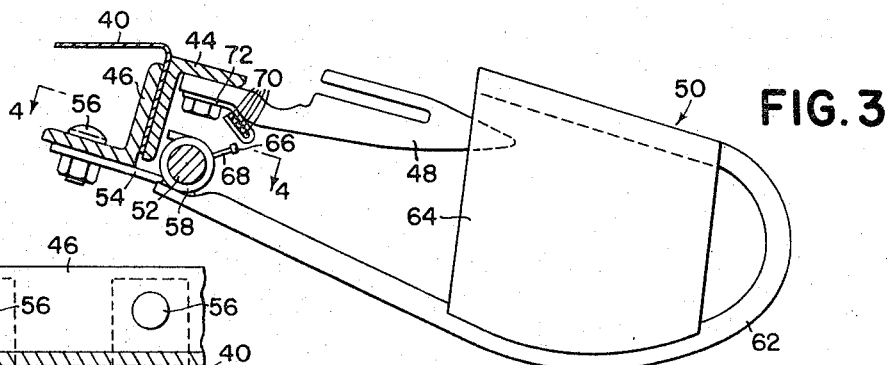
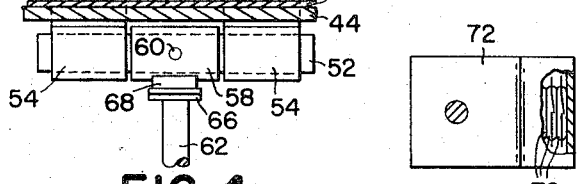

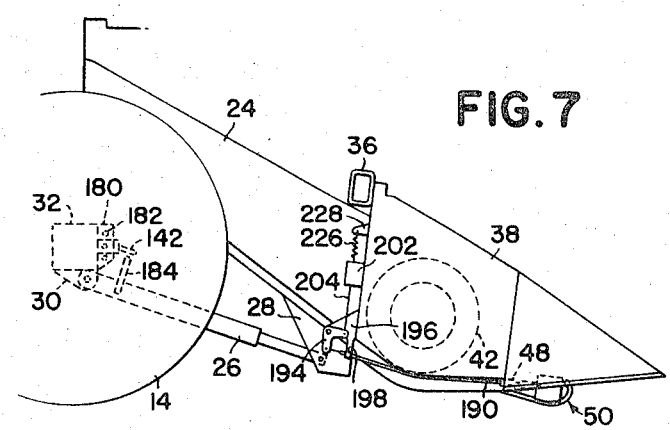

AUTOMATIC HEIGHT CONTROL SYSTEM FOR A CROP HARVESTER

CROSS REFERENCE TO RELATED APPLICATION

This application is a continuation-in-part of U.S. application Ser. No. 237,334 filed on Mar. 23, 1972, now abandoned.

BACKGROUND OF THE INVENTION

The present invention relates generally to an automatic height control system for a crop harvester having a vertically movable crop-gathering unit.

In the following specification and in the drawings, the crop harvester will be described and illustrated as a combine, but those skilled in the art will recognize that the automatic height control system of the present invention can be used with other agricultural harvesting implements. When combining certain crops, it is desirable to keep the crop-gathering unit as close to the ground as possible to ensure that all the crop or grain is gathered. However, it is also necessary to maintain a certain distance between the crop-gathering unit and the ground so that the crop-gathering unit does not dig into the ground. In most of the self-propelled implements, the operator is positioned above the crop-gathering unit and it is very difficult to tell exactly how high the crop-gathering unit is above the ground, particularly when harvesting a dense crop. To relieve the operator of this difficult task, it has been proposed to provide the combine with an automatic height control system which maintains the crop-gathering unit a predetermined distance above the ground.

Most of the commercially available height control systems have a plurality of ground followers or height sensors which are laterally spaced across the entire width of the crop-gathering unit and which are all interconnected to move in unison. This requires a different height sensing unit for each width of crop-gathering unit. Also, damage to any part of the height sensing unit requires replacement of the whole unit.

Most of the commercially available height sensing units have a mechanical connection with a control valve, and, due to the fact that the crop-gathering unit moves vertically with respect to the main body of the combine, the mechanical connection must provide for this vertical movement without having any effect on its connection with the valve. Also, there are various limitations on the mounting for a mechanical connection.

There have been proposals to provide hydraulic connections between the height sensing unit and control valve, but such hydraulic connections are generally too expensive to have any commercial value.

There have also been proposals to provide an electrical interconnection between the height sensing unit and the control valve, but, to date, such electrical systems have not been satisfactory due to the continuous adverse operating conditions and continuous switching required.

SUMMARY OF THE INVENTION

The principal object of the present invention is to provide an automatic height control system for the crop-gathering unit on a crop harvester in which the height sensing is accomplished by a plurality of individually operable ground followers or height sensors operatively associated with switches which are electrically connected to and for controlling a solenoid valve which controls the vertical movement of the crop-gathering unit.

Another object of the present invention is to provide a height control system which utilizes a plurality of magnetically operated reed switches which are unaffected by the adverse conditions under which they must operate.

Yet another object of the present invention is to provide an automatic height control system for the crop-gathering unit on a crop harvester which includes individually operable ground followers or height sensors, each of which controls at least a pair of switches to close one of the switches when in an intermediate position and close the other switch when in a raised position, the switches being connected through a logic circuit to a solenoid-controlled valve in a hydraulic circuit for raising and lowering the crop-gathering unit so that when any one of the switches corresponding to the raise position of the height sensors is closed, the solenoid-controlled valve is actuated to raise the crop-gathering unit, when none of the switches corresponding to the raise position of the height sensors are closed but at least one of the switches corresponding to the intermediate position of the height sensors is closed, the solenoid-controlled valve is deactivated so that the crop-gathering unit is maintained in a set position, and when none of the switches are closed, the solenoid-controlled valve is activated to lower the crop-gathering unit.

A further object of the present invention is to provide an automatic height sensing unit which has a plurality of individually operable ground followers or height sensing units, each height sensing unit including a plurality of magnetically operable switches connected through a multi-position selector switch to a logic circuit controlling a solenoid-operated valve so that by manipulation of the selector switch, different ones of the reed switches associated with each of the height sensors are connected to the logic circuit so that the selected operating height of the crop-gathering unit is varied.

The above objects and additional objects and advantages of the present invention will become apparent, along with the details of construction of a preferred embodiment of the invention, to those skilled in the art from a reading of the following detailed description when taken in conjunction with the accompanying drawings.

BRIEF DESCRIPTION OF THE DRAWINGS

In the drawings:

FIG. 1 is a top plan view of a combine with which the present invention is utilized;

FIG. 2 is an enlarged side elevational view of the forward portion of the combine illustrated in FIG. 1;

FIG. 3 is an enlarged side elevational view of a height sensor according to the present invention attached to the crop-gathering unit of the combine illustrated in FIG. 1;

FIG. 4 is a sectional view taken along the lines 4—4 of FIG. 3;

FIG. 5 is a top plan view of a switch mounting assembly, a portion being broken away to illustrate the switches;

FIGS. 7 and 8 are views similar to FIGS. 2 and 3 but illustrating a second embodiment of the invention;

FIG. 9 is a front elevational view of the switches and their mount used in the second embodiment of the invention;

FIG. 10 is a side elevational of the switches and their mount used in the second embodiment of the invention.

DESCRIPTION OF THE PREFERRED EMBODIMENT

Figure 6:
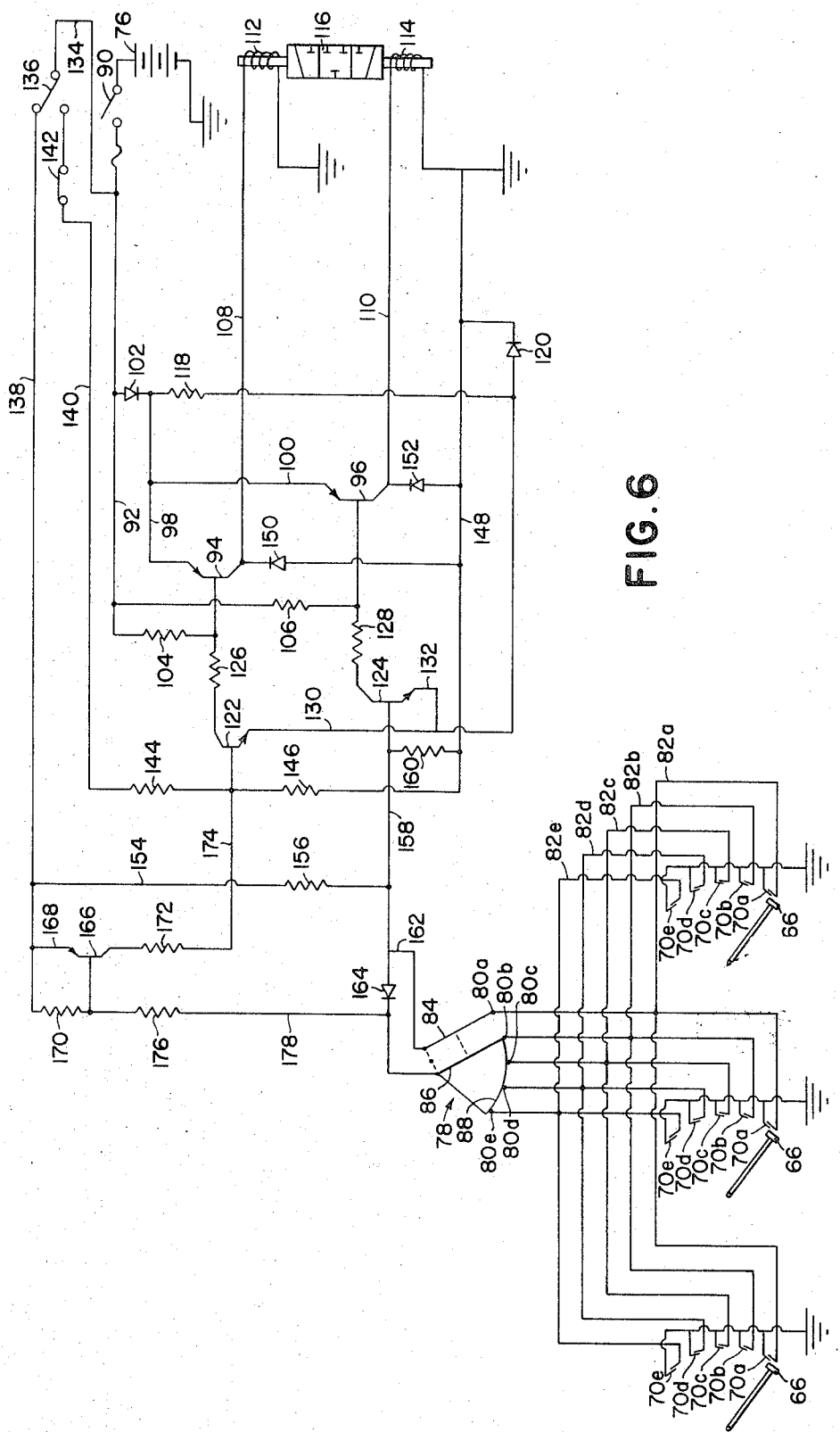
FIG. 6 is a schematic illustration of the electrical system of the automatic height control system according to the present invention.

Referring now to the drawings, a combine indicated generally by the numeral 10 includes a main body 12 supported on front and rear wheels 14 and 16. A grain tank 18 is mounted on the main body and directly in front of the grain tank, an engine 20 and an operator's platform 22 are also supported on the main body.

A forwardly extending feeder house 24 has its rear end pivotally connected to the main body for movement about a transverse axis and a pair of hydraulic cylinders 26 are connected between brackets 28 on the lower forward end of the feeder house 24 and brackets 30 secured to the axle 32 for the forward wheels 14.

A crop-gathering unit 34 is secured to the forward end of the feeder house 24 and is supported thereon for vertical movement therewith. The crop-gathering unit includes a main transverse beam 36, side walls 38, a bottom wall 40 having a downwardly extending flange at its forward end, and an auger 42 journaled between the side walls. A pair of right-angle members 44 and 46 are secured to the depending flange on the bottom wall 40 and extend across the entire width of the crop-gathering unit. The right-angle members 44 and 46 are oppositely mounted, with the forward right-angle member 44 having an upper horizontal leg and the rear right-angle member 46 having a lower horizontal leg. A plurality of knife guards 48 are secured to the horizontal leg of the right-angle member 44 in spaced positions across the crop-gathering unit.

The above-described combine is all of conventional structure or at least representative of conventional structure and is illustrated and described only to provide a specific example of a crop harvester with which one specific embodiment of the invention to be hereinafter described can be used.

The automatic height control system according to the present invention includes a plurality of independent ground followers or height sensing units 50 which are secured across the forward end of the crop-gathering unit in any selected position. There are three height sensing units 50 illustrated in FIG. 1, but those skilled in the art will realize that the number of height sensing units utilized is completely optional.

Each of the height sensing units includes a short shaft 52 which is pivotally secured in a position directly below the horizontal leg of the right-angle member 44 by a pair of spaced straps 54 which have their rear ends secured to the horizontal leg of the right-angle member 46 by bolts 56 and their forward ends loosely curled around the shaft 52. A sleeve 58 is mounted on the shaft 52 between the straps 54 and can be either secured to the shaft for rotation therewith by a pin 60 which extends through the sleeve and the shaft or freely movable on the shaft. A ground follower in the form of a rod 62 has its rear end welded to the sleeve 58 and extends forwardly therefrom to a position in front of the forward end of the guard 48 and then curves back over the top of the guard 48. Side plates 64 are secured to the overlapping portions of the rod 62 and enclose the forward tip of one of the guards 48 so that the ground follower is constrained to vertical pivotal movement with respect to one of the guards 48 and engagement between the guard and the rod determine the maximum movement of the ground follower.

An acutation member in the form of a magnet 66 is mounted on a pedestal 68 rigid with the sleeve 58 so that the actuation member moves with the ground follower and in a path corresponding to the vertical path of movement of the ground follower. A plurality of reed switches 70 are clamped between the legs of an aluminum switch mounting clip 72 which is bolted to the bottom of the guard 48 by the same bolt which secures the guard 48 to the right-angle member 44. The clip 72 mounts the reed switches in close proximity to the path of movement of the actuation member 66 and in positions corresponding to upper, intermediate and lower positions in the vertical path of movement of the ground follower. As can be seen in FIG. 5, the reed switches 70 are each enclosed in an envelope which protects them from dust, moisture or any other elements which may affect their operation.

In FIG. 6, the reed switches of each of the height sensing units are numbered consecutively 70a–70e with the reed switch 70e corresponding to the uppermost position of the ground follower with respect to the crop-gathering unit. One terminal of each of the reed switches 70 is connected to ground and the other terminal of each of the reed switches is connected to a source of electrical energy or a battery 76 through a multi-position double pole height selector switch indicated generally at 78 and a logic circuit to be described hereinafter. The reed switches 70a–70e are connected to contacts 80a–80e, respectively, of the selector switch 78 by leads 82a–82e. For purposes of illustration, the selector switch 78 includes a pair of simultaneously movable poles 84 and 86 which are adapted to engage any pair of adjacent contacts 80a–80e, with the pole 86 engaging the contact immediately above the contact engaged by the pole 84 and having a wiper 88 which engages all of the contacts above the contact engaged by the pole 84. However, the illustrated switch 78 is only a schematic showing of the function to be performed and other switches which will perform the function are available.

The logic circuit or sensing and activating means includes a main off-on switch 90 which connects a power lead 92 to the battery 76. The emitters of a pair of PNP transistors 94 and 96 are connected in parallel relationship by leads 98 and 100, respectively, to the power lead 92 through a diode 102. The diode 102 is also connected to ground by a resistor 118 and an additional diode 120. The bases of the transistors 94 and 96 are also connected in parallel relationship to the power lead 92 by resistors 104 and 106 respectively. A pair of leads 108 and 110 connect the collectors of the transistors 94 and 96, respectively, to raise and lower solenoids 112 and 114 which control the movement of a control valve 116 for the cylinders 26.

The collectors of a pair of NPN transistors 122 and 124 are connected to the resistors 104 and 106 in parallel relationship with the bases of transistors 94 and 96 by resistors 126 and 128 respectively. The emitters of the transistors 122 and 124 are connected to ground through leads 130 and 132 and the diode 120.

An input lead 134 branches off from the power lead 92 and is connected to the pole of a two-position switch 136. The switch 136 selectively interconnects the lead 134 with either one of a pair of input leads 138 and 140, the lead 140 having a limit switch 142 interposed therein for reasons to be described hereinafter. The lead 140 is connected to the base of the transistor 122 by a resistor 144 which is also connected to ground through an additional resistor 146 and a lead 148. The lead 148 is also connected to the collectors of the transistors 94 and 96 through diodes 150 and 152.

The input lead 138 is connected to the base of transistor 124 through a lead 154, a resistor 156 and a lead 158. The lead 158 is also connected to ground through a resistor 160 and the lead 148. Further, the lead 158 is connected to the pole 84 of the switch 78 through a lead 162 and is also connected to a diode 164.

The input lead 138 is also connected to the emitter of a PNP transistor 166 by a lead 168 and to the base of the transistor 166 by a resistor 170. The collector of the transistor 166 is connected to the base of the transistor 122 by a resistor 172 and a lead 174. The resistor 170 is also connected to the diode 164 and the pole 86 of the selector switch 78 by a resistor 176 and lead 178.

As will become apparent in the hereinafter description of operation, the sensing and activating circuit can be broken into a raise portion and a lower portion, with the transistors 124 and 96 constituting a lower portion and the transistors 166, 122 and 94 constituting the raise portion. In the description of operation, the effect of the resistors will be ignored, but those skilled in the art will understand that the resistors are necessary to limit the current and provide the proper bias on the various transistors.

The limit switch 142 is mounted on a bracket 180 secured to the axle 32 in a position to be contacted by an abutment member 184 on the cylinder 26. The bracket 180 is provided with a plurality of mounting apertures 182 which receive a mounting pin for the limit switch 142 so that through the use of a different one of the apertures 182 the position of the limit switch 142 with respect to the abutment member 184 can be varied.

To operate the automatic height control system, the operator will close the switch 90 to provide power to the sensing and activating circuit and will also move the switch 136 from the position illustrated in FIG. 6 to interconnect the leads 134 and 140. When the switch 90 is closed, the diode 102 will provide a reference bias on the transistors 94 and 96. With the switch 90 closed, the emitters of the transistors 94 and 96 are connected to the source through the leads 98 and 100, the diode 102, and the power lead 92. However, the bases of the transistors 94 and 96 are also connected to the source through the resistors 104 and 106 and the power lead 92. The voltage bias on the bases of the transistors 94 and 96 prevents current from flowing through these transistors or, stated otherwise, turns off the transistors 94 and 96. The collector of the transistor 122 is also connected to the source through resistors 126 and 104 and the power lead 92. When the switch 136 interconnects the input leads 134 and 140, a voltage bias is provided on the base of the transistor 122 which turns on or permits current to flow through the transistor 122. With the transistor 122 on, the voltage bias on the base of the transistor 94 lowers and the transistor 94 turns on and permits current flow through the transistor 94 and the lead 108 to solenoid 112. Activation of the solenoid 112 moves the valve 116 to a raise mode so that fluid is supplied to the cylinders 26 to raise the crop-gathering unit 34 of the combine.

The collector of the transistor 124 is also connected to the source, but there will be no voltage bias on its base to turn it on.

As the cylinders 26 extend to raise the crop-gathering unit about the rear pivot for the feeder house, the cylinders 26 move about their pivotal connection with the brackets 30 until the abutment member 184 contacts and opens the switch 142. With the switch 142 open, the voltage bias on the base of the transistor 122 drops to the point where a reference voltage provided by the diode 120 turns off the transistor 122. With the transistor 122 turned off, the voltage bias on the base of transistor 94 increases and turns off the transistor 94 to deactivate the raise solenoid 112 so that the valve 116 returns to a hold mode. The diode 150 provides a short circuit path for the voltage induced in the solenoid 114 as it is deactivated. In this manner, the limit switch 142 determines the maximum height of the crop-gathering unit when the switch 136 is in its raise position to interconnect the input leads 134 and 140.

With the crop-gathering unit raised, the operator can drive the combine to the field to be harvested and, as soon as he is ready to make a pass through the field, move the switch 136 to the operating position illustrated in FIG. 6 in which it interconnects the input leads 134 and 138. It should be noted that when the crop-gathering unit was raised, the ground followers 62 moved to their lowermost position with respect to the crop-gathering unit so that each of the actuation members 66 is below all the reed switches 70 and all the reed switches 70 are open. With the switch 136 in the position illustrated in FIG. 6, a voltage bias is provided on the base of the transistor 124 through the lead 154, the resistor 156, and the lead 158. The bias on the base of the transistor 124 turns on the transistor to permit current flow therethrough. With current flowing through the transistor 124, the bias on the base of the transistor 96 drops so that the transistor 96 is turned on and current can flow through lead 110 to activate the lower solenoid 114 which moves the valve 116 to a lower mode so that the crop-gathering unit begins to lower. The emitter of the transistor 166 is connected to the source through the lead 168, but the base of the transistor 166 is also connected to the source through the resistor 170 and the bias on the base of the transistor 166 prevents the transistor 166 from turning on.

When the crop-gathering unit 34 reaches its selected working height with respect to the ground, one or more of the ground followers 62 will engage the ground and pivot upwardly, moving its actuation member 62 to a position where it closes its reed switch 70a. With one or more of the reed switches 70a closed, the base of the transistor 124 is connected to ground through the leads 158, 162, the pole 84, lead 82a and the reed switch 70a. With the base of the transistor 124 connected to ground, the voltage bias thereon drops to the point where the reference voltage provided by the diode 120 turns off the transistor 124. With the transistor 124 turned off, the voltage bias on the base of transistor 96 increases and turns off the transistor 96 so that the lower solenoid 114 is deactivated and the valve 116 returned to its hold mode. The diode 152 provides a short circuit path for the voltage induced in the solenoid 114 as it is deactivated.

The crop-gathering unit will remain in the same position with respect to the main body of the combine until one or more of the ground followers hit a depression or a rise in the ground surface so that all of the actuator members 66 drop below all the reed switches 70 or at least one of the actuator members 66 moves up to close its respective reed switch 70b. If all the actuator members move down below all of the reed switches, the voltage bias on the base of the transistor 124 increases and turns on the transistor 124 which decreases the voltage bias on the base of the transistor 96 to turn on the transistor 96 and activate the solenoid 114. If one or more of the actuation members closes its respective reed switch 70b, the base of the transistor 166 is connected to ground through the resistor 176, lead 178, pole 86, lead 82b and reed switch 70b. This reduces the voltage bias on the transistor 166 to turn on the transistor 166. The current flow through the transistor 166, resistor 172 and lead 174 increases the bias on the base of transistor 122 and turns on the transistor 122. Current flow through the transistor 122 decreases the bias on the base of transistor 94 and turns on the transistor 94 to activate the raise solenoid 112. With one or more of the reed switches 70b closed, the line 154 is connected to ground through the diode 164 and the bias on the base of transistor 124 is decreased so that this transistor is turned off.

Since all the reed switches 70b–70e are connected to the pole 86 through the wiper 88, the raise solenoid 112 will be activated even if one or more of the ground followers 68 is moved upwardly so fast that its actuation member 66 moves past its respective reed switch 70b before the proper adjustments can be made.

By moving the poles of the height selector switch 78 to an alternate position, the selected working height of the crop-gathering unit can be varied. For example, if the pole 84 is moved into engagement with the contact 80b and the wiper 88 of the pole 86 is moved into engagement with the contacts 80c–80e, closing of any one of the reed switches 70c–70e provide a raise signal to the sensing and activating circuit to activate the raise solenoid 112. Closing of one or more of the reed switches 70b when none of the reed switches 70c–70e are closed provides a signal to the sensing and activating means to deactivate the lower solenoid 114. When all the actuation members 166 are below the reed switches 70b, even though they may be in position to close the switches 70a, there is no signal to the sensing and activating means and the lower solenoid 114 is activated.

A second embodiment of the invention is illustrated in FIGS. 7–11 wherein parts common to the embodiment illustrated in FIGS. 1–6 are identified with common reference numerals. As in the first embodiment of the invention, the second embodiment also includes a plurality of independent ground followers or height sensing units 50 which are secured across the forward end of the crop-gathering unit in any selected position. Each of the height sensing units includes a short shaft 52 which is pivotally secured in a position directly below the horizontal leg of the right-angle member 44 by a pair of spaced straps 54 with their rear ends secured to the horizontal leg of the right-angle member 46 by bolts 56 and their forward ends loosely curled around the shaft 52. A sleeve 58 is mounted on the shaft 52 between the straps 54 and can be either secured to the shaft for rotation therewith or be freely movable on the shaft. A ground follower in the form of a rod 62 has its rear end welded to the sleeve 58 and extends forwardly therefrom to a position in front of the forward end of the guard 48 and then curves back over the top of the guard 48. Side plates 64 are secured to the overlapping portions of the rod 62 and enclose the forward tip of the guard 48 so that the ground follower is constrained to vertical pivotal movement with respect to the guard 48 and engagement between the guard and the rod determine the maximum movement of the ground follower.

An upstanding crank arm 186 is secured to the sleeve 58 and has the inner member 188 of a push-pull cable secured to its upper end. The crank arm 186 is mounted toward the end of the sleeve 58 to prevent interference with the bolt mounting the guard 48. The push-pull cable extends through suitable apertures provided in the right-angle members 44 and 46 and the bottom wall 40 of the crop-gathering unit and the forward end of its outer sheathe 190 is secured in a fixed position by a clamp 192 which is welded to the vertical leg of the right-angle member 46. The rear end of the inner wire 188 of the push-pull cable is secured to the depending arm of a crank 194 which is pivotally mounted on a bracket 196 secured to the rear wall of the crop-gathering unit. The rear end of the sheathe for the push-pull cable is secured in a fixed position by a clamp 198 secured to the bracket 196 in any suitable manner. A horizontal arm of the crank 194 is secured to an actuation member 200 of switch means indicated generally at 202 by a cable 204.

The switch means 202 includes a mounting bracket 206 which is secured to the rear wall of the crop-gathering unit. A pair of lower mounting blocks 208a and 210a are mounted on the lower portion of the bracket 206 in a fixed position by bolts 212. An upper pair of mounting blocks 208b and 210b are secured to the mounting bracket 206 by bolts 212, and the bolts 212 extend through slots 214 provided in the mounting bracket 206 so that the mounting blocks 208b and 210b can be adjusted relative to the mounting blocks 208a and 210a for a reason to be explained hereinafter. Reed switches 216a and 216b are embedded in the mounting blocks 208a and 208b respectively, and permanent magnets 218a and 218b are embedded in the mounting blocks 210a and 210b. The mounting blocks 208 and 210 are made of a plastic or similar material so that they will not affect the magnetic field of the magnets 218 so that the magnets, in the absence of some block to the magnetic field, will close the reed switches 216.

Each pair of mounting blocks 208 and 210 is grooved at the mating faces of the blocks to slidably receive the actuation member 200 which takes the form of a plate-like slide which is provided with an opening or window 220. The slide 200 normally blocks the magnetic field of the magnets 200, but alignment of the window 220 with either one of the magnets permits the magnetic field to close the associated reed switch 216. The lower end of the slide 220 is provided with an aperture 222 to which the cable 204 is anchored, and the upper end of the slide 220 is provided with an aperture 224 to which the lower end of a spring 226 is anchored. The upper end of the spring 226 is anchored to a bracket 228 secured to the rear wall of the crop-gathering unit.

Figure 11:
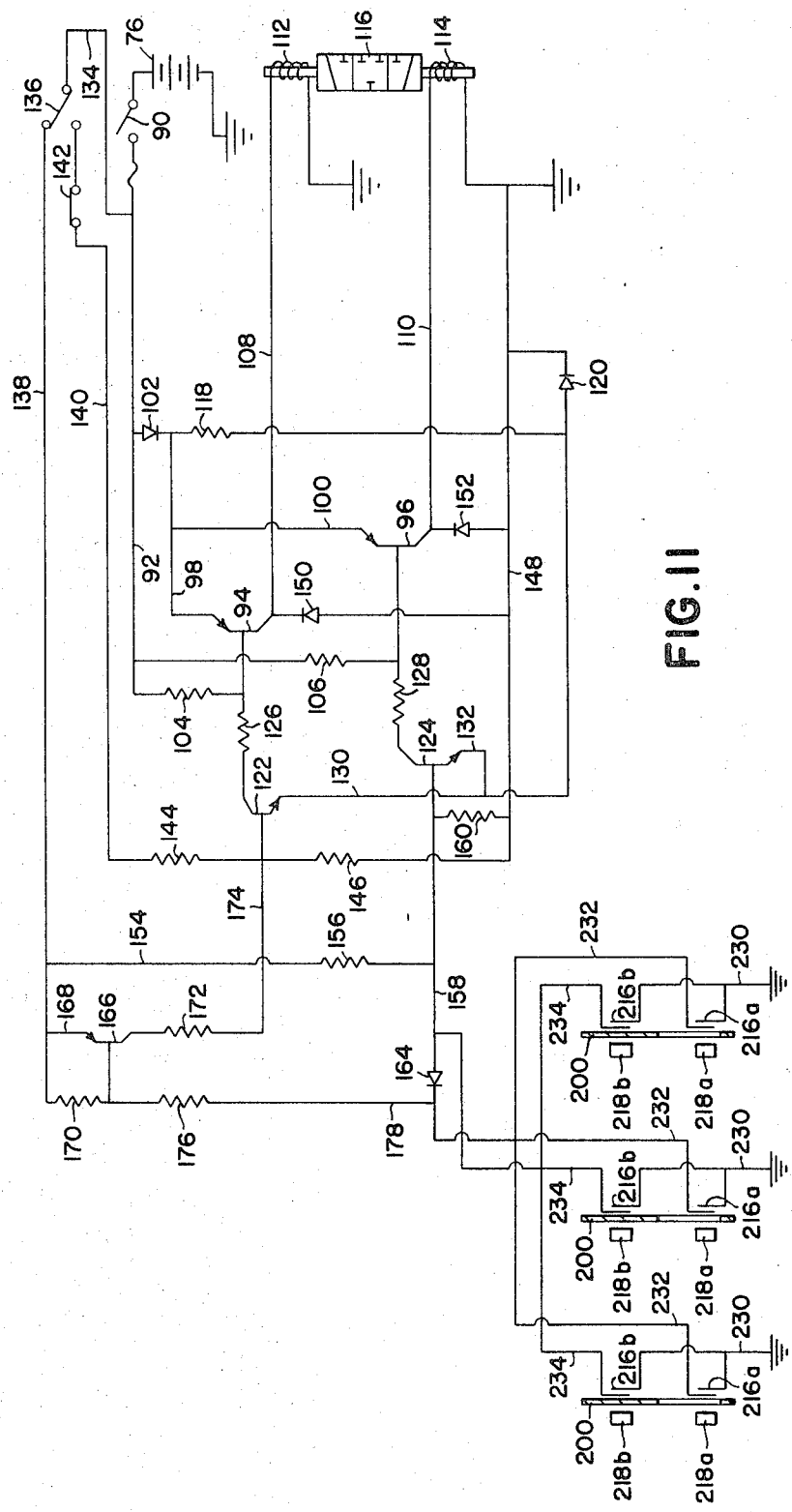
FIG. 11 is a view similar to FIG. 6 but illustrating the switch arrangement used in the second embodiment of the invention.

In FIG. 11, the reed switches 216 are illustrated as being connected directly to a logic circuit which is identical to that illustrated in FIG. 6. Specifically, one terminal of each reed switch is connected to ground through a lead 230 while a lead 232 connects the second terminal of each reed switch 216a with the lead 178 of the logic circuit or to the raise portion of the logic circuit while a lead 234 connects the second terminal of each of the reed switches 216b with the lead 158 of the logic circuit or the lower portion of the logic circuit. The remainder of the logic circuit will not be described since it is identical to that disclosed in FIG. 6.

In operation of the automatic height control system illustrated in FIGS. 7-11, the actuation member or slide 200 of each of the switch means 202 will move with its respective ground follower 50. When the ground follower 50 is in its lowermost position with respect to the crop-gathering unit, the interconnected slide 200, due to its connection with the ground follower and the bias of the spring 226 will move to an uppermost position in which the window 202 is above the reed switch 216b so that the slide locks the magnetic field of the magnet 218a and 218b and prevents closing of the reed switch 216a and 216b. This position of the slide 200 will be referred to as its lower position since when in this position both of the reed switches 218a and 218b will be open and the logic circuit will be conditioned to provide the lower signal to the solenoid 114 of valve 116. When the ground follower 50 moves upwardly relative to the crop-gathering unit, the interconnected slide 200 will be moved downwardly to an intermediate position in which the window 220 permits the magnetic field from the magnet 218b to close the reed switch 216b. This intermediate position of the slide 200 will be referred to as the hold position since with the reed switch 216a closed and the reed switch 216b open, the logic circuit will be conditioned to provide the hold signal to the solenoids 112 and 114 of the valve 116. Additional upward movement of the ground follower 50 relative to the crop-gathering unit will cause additional downward movement of the interconnected slide 200 so that the window 220 will permit the magnetic field of the magnet 218a to close the reed switch 216a. This position of the slide or actuation member 200 will be referred to as the raise position since with the reed switch 216a closed, the logic circuit is conditioned to provide the raise signal to the solenoid 112 of the valve 116.

Due to the length of the window 220 and the actuation member 200, the intermediate position of the actuation member 200 extends over a considerable range. However, this range can be shortened or lengthened by moving the mounting blocks 208b and 210b closer to or further away from the mounting blocks 208a and 210a. This movement of the mounting blocks is facilitated by the slots 214.

Although the operation of the embodiment illustrated in FIGS. 7-11 has only been briefly described, those skilled in the art will understand its operation since the switch means 202 are connected to the logic circuit so that the movements of the ground followers 50 have the same effect on the logic circuit as do the ground followers in the FIGS. 1-6 embodiment. The only distinctions between the two embodiments is that the range of the intermediate position of the second embodiment can be varied by movement of the upper mounting block while in the first embodiment, the range of the intermediate position is fixed but the working position of the crop-gathering unit relative to the ground surface can be varied through the selector switch 78.

Having thus described and illustrated two preferred embodiments of the invention, various modifications within the spirit and scope of the invention will become apparent to those skilled in the art and can be made without departing from the underlying principles of the invention.

We claim:

1. In a crop harvester having vertically adjustable crop-gathering means and hydraulic power means for raising and lowering the crop-gathering means when fluid is supplied thereto and exhausted therefrom respectively, an automatic height control comprising: a plurality of individually movable ground followers mounted on the crop-gathering means in transversely spaced relationship and for pivotal movement in a generally vertical path; electrical switch means associated with each follower and each switch means including an actuation member movable with its respective ground follower between raise, hold and lower positions; a solenoid valve movable between raise, hold and lower modes controlling the flow of fluid to and from the hydraulic power means; electrical circuit means including a source of electrical energy connected to and for controlling the movement of the solenoid valve between its modes; the circuit means including logic means connected to all the switch means and responsive to the conditions of the switch means to move the valve to its lower mode when all the actuation members of the switch means are in their lower positions, to move the valve to its hold mode when at least one actuation member is in the hold position and the remainder are in the lower position, and to move the valve to its raise mode when any one of the actuation members is in its raise position.

2. A crop harvester as set forth in claim 1 wherein each of the switch means includes a pair of reed switches and a magnetic actuation member, the actuation member is movable in a path corresponding to the vertical path of movement of the ground follower, the reed switches are arranged closely adjacent the path of movement of the actuation member in positions corresponding to upper and intermediate positions in the vertical path of movement of the ground follower and the raise and hold positions of the actuation member.

3. A crop harvester as set forth in claim 1 wherein the electric circuit means includes a manually operable, override switch between the source and logic means and movable between a normal operating position in which the logic means is responsive to the positions of the switch means and a raise position in which the logic means is activated to move the valve to its raise mode irrespective of the conditions of the switch means.

4. A crop harvester as set forth in claim 3 wherein a limit switch in series with the override switch is adjustably mounted on a fixed portion of the crop harvester in a position to be contacted and opened by a vertically movable part of the crop harvester whereby, when the override switch is in its raise position, the maximum height of the crop-gathering means is limited.

5. In a crop harvester having vertically adjustable crop-gathering means, hydraulic power means for raising and lowering the crop-gathering means when fluid is supplied thereto and exhausted therefrom, valve means movable between raise, hold and lower modes controlling the flow of fluid to and from the hydraulic power means, an automatic height control system for the crop-gathering means comprising: a plurality of individually movable ground followers mounted on the crop-gathering unit in transversely spaced relationship and for limited pivotal movement in a generally vertical path; a source of electrical energy; electrical switch means associated with each of the ground followers and each switch means being connected to the source and having an actuation member movable with its respective ground follower between raise, hold and lower positions corresponding to upper, intermediate and lower positions in the vertical path of movement of its respective ground follower; raise and lower solenoids connected to the valve means for moving the valve means from its hold mode to its raise and lower modes, respectively, when activated; electronic sensing and activating means connected to the source, all the switch means and the solenoids responsive to the conditions of the switch means to activate the lower solenoid when all the actuation members of the switch means are in their lower position and to activate the raise solenoid when any one of the actuation members is in its raise position.

6. A combination as set forth in claim 5 wherein each of the switch means includes a pair of reed switches connected to the source and a magnetic actuation member movable in a path corresponding to the path of movement of the ground follower, the reed switches are arranged in close proximity to the path of movement of the actuation member in positions corresponding to upper and intermediate positions in the vertical path of movement of the ground follower and the raise and hold positions of the actuation member, the sensing and activating means includes a first portion connected to the source, raise solenoid and the upper reed switch of each of the switch means and responsive to any one of the actuation members moving to its raise position to activate the raise solenoid, the sensing and activating means including a second portion connected to the lower reed switch of each of the switch means, the source, the lower solenoid and the upper portion normally activating the lower solenoid and responsive to movement of any one of the actuation members to the hold position and/or activation of the raise solenoid to deactivate the lower solenoid.

7. A combination as set forth in claim 5 wherein each of the switch means includes a plurality of reed switches and a magnetic actuation member movable in a path corresponding to the vertical path of movement of the ground followers, the reed switches are arranged in close proximity to the path of movement of the actuation member in positions corresponding to upper, intermediate, and lower positions in the vertical path of movement of the ground follower and are connected to a multi-position height selector switch having a plurality of contacts and a pair of simultaneously movable selector members spaced to engage adjacent contacts, successive reed switches are connected to successive contacts with corresponding reed switches of the plurality of switch means being connected to the same terminal, the sensing and activating means includes a first raise portion connected to the source, raise solenoid, and the selector member which is in engagement with the contact connected to the reed switches corresponding to upper positions in the vertical path of movement of the ground followers and responsive to the closing of any one of the reed switches to which it is connected to activate the raise solenoid, and the sensing and activating means includes a second portion connected to the source, lower solenoid, upper portion, and the selector member in engagement with the contact connected to the reed switches corresponding to intermediate positions in the vertical path of movement of the ground followers normally activating the lower solenoid and responsive to the closing of any one of the reed switches to which it is connected and/or activation of the raise solenoid to deactivate the lower solenoid whereby opening and closing of the reed switches caused by movement of the ground followers with respect to the crop-gathering unit will maintain the crop-gathering unit at a selected height above the ground surface and, by movement of the selector members into engagement with other contacts, the selected height can be changed.

8. A combination as set forth in claim 7 wherein the selector member connected to the raise portion of the sensing and activating means includes means engageable with all the contacts above the contact engaged by the selector member connected to the lower portion of the sensing and activating means.

9. A combination as set forth in claim 7 wherein the sensing and activating means is connected to the source through an override circuit which causes the raise portion of the sensing and activating means to activate the raise solenoid, and manually operable override switch means are provided to selectively complete the override circuit and break the normal connection between the source and sensing and activating means.

10. A combination as set forth in claim 9 wherein a normally closed limit switch in series with the override switch means is adjustably mounted on a fixed portion of the combine in a position to be contacted and opened by a portion of the combine movable vertically in response to vertical movement of the crop-gathering unit, whereby the limit switch determines the maximum height of the crop-gathering unit when the sensing and activating means is connected to the source through the override circuit.

11. In a crop harvester having vertically adjustable crop-gathering means and hydraulic power means for raising and lowering the crop-gathering means when fluid is supplied thereto and exhausted therefrom respectively, an automatic height control system comprising: a plurality of individually movable ground followers mounted on the crop-gathering means in transversely spaced relationship and for pivotal movement in a generally vertical path between upper, intermediate and lower positions with respect to the crop-gathering unit; electrical switch means associated with each follower and each switch means including an actuation member movable with its respective ground follower between raise, hold and lower positions corresponding to the upper, intermediate and lower positions, respectively, of its respective ground follower; a solenoid valve movable between raise, hold and lower modes controlling the flow of fluid to and from the hydraulic power means, electrical circuit means including a source of electrical energy connected to and for controlling the movement of the solenoid valve between its modes; the circuit means including logic means connected to all the switch means and responsive to the conditions of the switch means to move the valve to its lower mode when all the actuation members of the switch means are in their lower positions, to move the valve to its hold mode when at least one actuation member is in the hold position and the remainder are in the lower position, and to move the valve to its raise mode when any one of the actuation members is in its raise position.

12. A crop harvester as set forth in claim 11 wherein each of the switch means includes a pair of spaced reed switches and a magnet associated with each reed switch for closing the same, and the actuation member includes a movable slide between the reed switches and their associated magnets to normally block the magnetic fields of the magnets from the reed switches, and the slide is provided with a window which, when moved to a position between a reed switch and its associated magnet permits the magnetic field to close the switch.

13. A crop harvester as set forth in claim 12 wherein the spacing between the pair of reed switches of each switch means is variable.

* * * * *